Nov. 22, 1932.                J. P. HOLT                1,888,553
                              AUTOMOBILE
                    Filed Oct. 6, 1930       2 Sheets-Sheet 2

WITNESS:

INVENTOR
Joseph P. Holt
BY
HIS ATTORNEY

Patented Nov. 22, 1932

1,888,553

UNITED STATES PATENT OFFICE

JOSEPH P. HOLT, OF MERION, PENNSYLVANIA

AUTOMOBILE

Application filed October 6, 1930. Serial No. 486,529.

This invention relates to motor vehicles, and particularly to the sustaining of the load thereof during operation.

The invention has two primary objects, viz: the sustaining of the excess weight or load in such position in respect to the traction means, whereby the load will be unaffected or little affected by irregular surfaces over which the traction means travel, thereby acting as a shock absorber for the vehicle load.

Second, by sustaining the vehicle load, that is, the excess load not required for traction, thereby permitting greater speed with less fuel consumption.

According to the invention, the vehicle body is provided with elevators which are acted upon by the rush of air when the vehicle is in motion and whereby the body is raised and sustained above the traction means, thereby relieving the traction means of the weight thereof.

Figure 1:
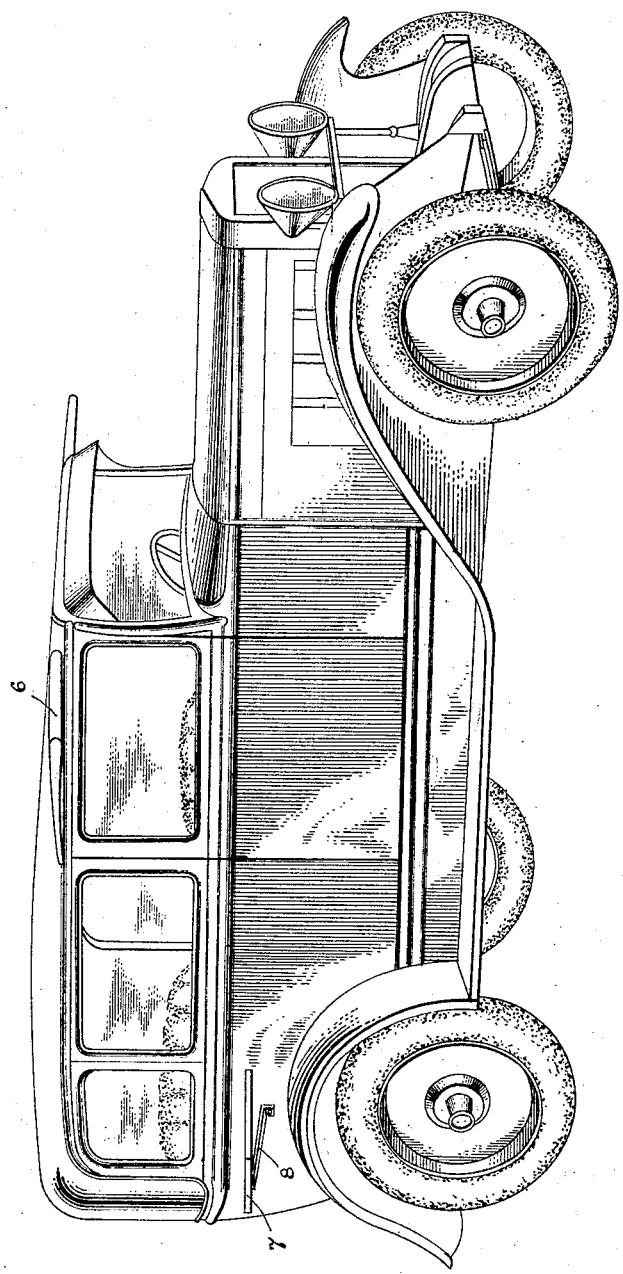
Figure 2:
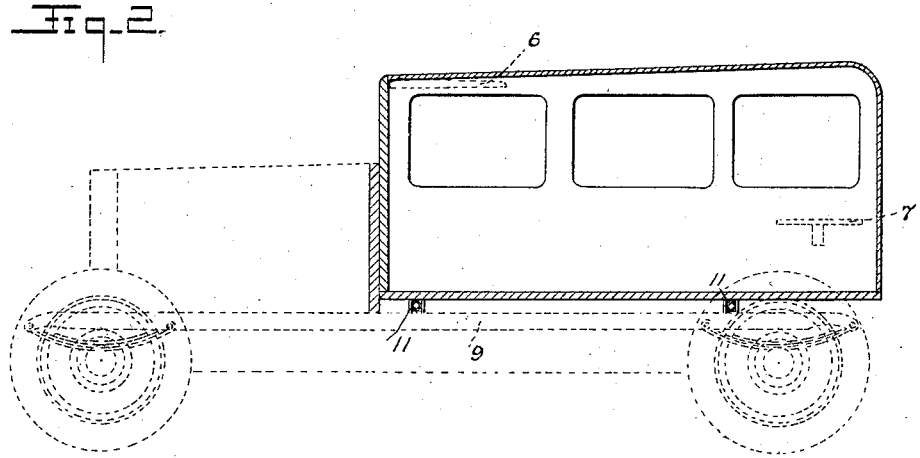
Figure 3:
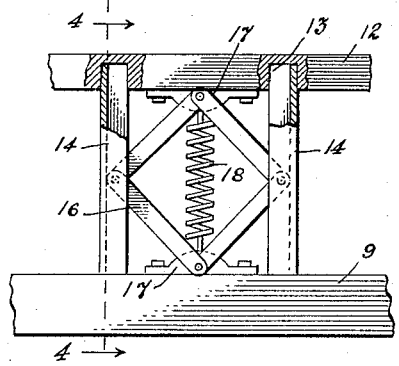
Figure 4:
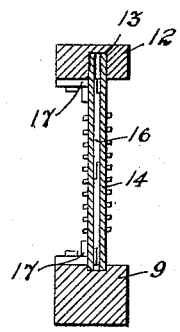
Figure 5:
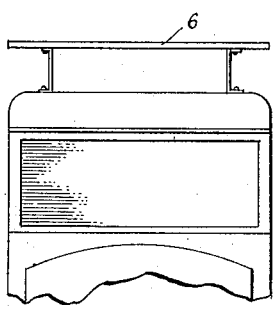

The drawings illustrate embodiments of my invention and the views therein are as follows:

Figure 1 is a perspective view of a conventional motor car with elevators attached, Figure 2 is a side view of an automobile arranged to permit the body only of the vehicle to be raised and supported above the chassis thereof, Figure 3 is a vertical sectional view of expansible means between the chassis and body for permitting the raising of the body without material longitudinal displacement, Figure 4 is a vertical sectional view of the same on the line 4—4 of Figure 3, looking in the direction of the arrows, and Figure 5 is a fragmentary front view of an automobile truck showing an elevator arranged on the top of the body thereof.

It is well-known that when a heavy body is propelled with speed that wings or elevators protruding therefrom will raise the body by reason of its momentum, and while the principle is common in aeronautics, the application of this principle for raising part of a body or the load from the traction means of a motor car is novel.

In Figure 1 the motor vehicle there shown is provided near the forward upper end of the same with a wing 6 and at the rear and intermediate of the top and bottom of the body, with the wing 7 which is supported by a strut 8 in any convenient manner.

Of course, both sides of the motor vehicle will be provided with the wings 6 and 7 and the size and location of these wings will depend entirely upon the weight of the body or load of the vehicle.

It may be advisable, in some cases, to supply the body with a greater number of wings or elevators and particularly may this be so in case of a very heavy automobile body and one designed for carrying a large number of passengers or a large load of any kind.

The principle employed in my invention is that, as the vehicle is propelled, the rush of air will act upon the wings or elevators and elevate and sustain the load above the traction means.

When a motor vehicle is traveling at slow speed, shocks or jars, caused by the wheels striking an obstruction, are conveyed to the body with less force, particularly as to the spring recoil, than when the car is traveling at a greater rate of speed, and in like manner, when the car is traveling at a slower rate of speed, the rush of air to the elevators will be less and therefore the car body will not be elevated and sustained at so great a height or with as much force as when the car is traveling at a greater rate of speed.

In Figure 1 the elevators are secured to the body without changing the ordinary and usual manner of supporting the body directly on the chassis which in turn is supported on springs suspended from the traction means, and in such instance the entire chassis, consisting of the body, motor, hood, radiator, etc., will be raised from the center of tension of the springs by the rush of air to the elevators when the vehicle is in motion.

In Figure 2 there is diagrammatically shown a motor vehicle whose body is resiliently supported on the chassis 9 by means of the wings 6 and 7 and the body is supported on the chassis by expansible means 11 which are designed for permitting the raising of the body above the chassis without material relative longitudinal displacement.

In Figure 3, considering that 12 is the bottom of the body, it is provided with slots 13 for receiving the upper ends of guide channels 14. These guide channels are to prevent longitudinal displacement of the toggle member 16, which has its upper and lower ends pivoted to the bottom of the body and the top of the chassis by brackets 17.

Between these brackets 17 there is provided a spring 18 which, when the rush of air to the elevators raises the body on the chassis, is elongated, and the outer ends of the toggle member 16 travel in the channels 14.

This device merely illustrates one method of supporting the body on the chassis to provide for its upward movement. Many alternative constructions would be equally, if not more, advantageous.

Consideration has been given to the fact that the steering wheel, etc., being securely mounted on the shaft, there will be relative movement between the body and the same, but since the upward lift of the body will be very slight at most, this slight change of position of these parts is considered negligible.

While I have not shown any means or mechanism for adjusting the angle of the wings, this is contemplated in connection with my invention and as this is a common procedure in aeronautics, I have deemed it unnecessary to illustrate detailed constructions.

Figure 5 shows one or more wings attached to the top of a vehicle. This will prove advantageous in the cases of large motor trucks, busses and the like, and additional wings may also be provided on the sides thereof, as shown in Figure 1.

On account of the great weight, however, it is advisable to provide additional wings or wings having a larger area for sustaining the greater load.

As the law limits the width or spread of motor vehicles, the wings must be designed to comply with the law and, therefore, are limited in length.

In some instances I may dispense with the fenders or mud-guards and provide baffles or wings in proximity to the location of the conventional fenders or mud-guards for assisting in elevating or sustaining the load.

Of course, the combinations illustrated may be modified and changed in various ways without departing from the invention herein set forth and hereafter claimed.

The invention is hereby claimed as follows:

1. A motor vehicle having a chassis supported by springs above the traction means, a body, extensible means permitting the raising of the vehicle body above the chassis, and elevators on said body adapted to be acted upon by the rush of air when the vehicle is in motion for raising and sustaining said body above said chassis.

2. A motor vehicle having a chassis supported by springs above the traction means, a body, extensible means permitting the raising of the vehicle body above the chassis, and elevators on said body adapted to be acted upon by the inrush of air when the vehicle is in motion for raising and sustaining said body above said chassis, said extensible means being constructed to prevent relative lateral movement between said body and chassis.

3. In a motor vehicle having wheels and a chassis resiliently supported above the same, the combination of a body having extensible means connecting same to said chassis, and wings adapted to act as elevators for expanding said means and raising said body from said chassis upon the inrush of air caused by the motion of the vehicle.

In testimony whereof I have signed my name to this specification.

JOSEPH P. HOLT.